United States Patent Office 3,423,330
Patented Jan. 21, 1969

3,423,330
SILVER OXIDE CATALYSTS FOR DECOMPOSITION OF DILUTE $H_2O_2$
John Francis Start, Hamilton Township, Mercer County, N.J., Leonard Seglin, New York, N.Y., and Borivoj Richard Franko-Filipasic, Lower Makefield Township, Bucks County, Pa., assignors to FMC Corporation, New York, N.Y., a corporation of Delaware
No Drawing. Continuation-in-part of application Ser. No. 410,959, Nov. 13, 1964. This application Mar. 22, 1965, Ser. No. 441,923
U.S. Cl. 252—427    4 Claims
Int. Cl. B06j 11/20

ABSTRACT OF THE DISCLOSURE

A silver oxide catalyst useful for the rapid decomposition of dilute hydrogen peroxide, comprising silver oxide carried on granules of a porous nonpowdery base such as magnesia, carbon, cellulosic fiber or cellulosic fiber impregnated with inorganic oxides of alumina or silica.

---

This application is a continuation-in-part of application Ser. No. 410,959, filed Nov. 13, 1964, now abandoned.

This invention relates to catalysts particularly useful in the methods of producing warm lathers such as are described and claimed in the above identified application, and aims to provide a catalyst which decomposes dilute hydrogen peroxide quickly and substantially completely in the presence of lather producing surfactants, without being substantially affected by them, so that it may be used over and over again.

Copending application Ser. No. 410,959 describes a number of devices in which aqueous solutions of surfactants are fed into a decomposition chamber along with dilute hydrogen peroxide, where a catalyst is present which decomposes the hydrogen peroxide with the simultaneous production of oxygen and heat, thereby producing warm to hot lather useful for shaving, shampooing, etc. Preferably, the peroxide is mixed with the detergent solution before being admitted to the decomposition chamber; this requires special formulations to insure against premature decomposition of the peroxide.

While there are a host of materials which will induce the decomposition of hydrogen peroxide and work after a fashion in these devices, the preparation of a sound commercial device is contingent upon the use of a catalyst which fulfills as many as possible of a rather substantial number of requirements. First, it is desirable that the catalyst act rapidly so that the device can be used with a minimium of delay. This is particularly true in the case of the preparation of shaving lather, where it is highly desirable that only a few seconds elapse between the time the device is activated and the time the lather is fed out of the device. It is desirable, moreover, that rather small amounts of catalyst be used, in order to reduce cost, to reduce the loss of heat by absorption in the catalyst, and to insure against excessive pressure drop due to the catalyst. Moreover, the catalyst must be able to work with rather dilute peroxide of the order of 10% or less in the presence of the surfactant. Another desirable attribute of a catalyst is its ability to substantially exhaust the hydrogen peroxide in a very short time, so that there is essentially little or no peroxide left in the foam as discharged from the container. Finally, the catalyst should be in a mechanical form such that it is retained in the catalyst chamber and not carried back into the main body of the peroxide or out with the foam, since even the most innocuous materials might be objectionable to the user.

We have discovered a group of catalysts which meet all of these requirements for use with dilute aqueous hydrogen peroxide surfactant solutions, and methods for their preparation. Our new catalysts comprise argentous oxide distributed on absorbent carriers in other than fine powder form. The carrier selected may be a granular porous metal oxide or absorbent carbon, but is preferably a fibrous material and, more preferably, a fibrous material containing a finely divided oxide distributed therethrough.

In one method of preparing the catalyst, we saturate granules of a porous basic oxide such as magnesium oxide with an aqueous silver salt solution; precipitation of the silver content results. The solubles are washed out and the product is dried at or below 100° C. to remove the water. In a second method we impregnate any nonpowdery porous substrate with silver ammonia hydroxide, which is then decomposed at a relatively low temperature to produce argentous oxide, ammonia and water.

It has been known for many years that most heavy metals and their compounds will tend to decompose hydrogen peroxide on contact, and a great deal of work has been done on the stabilization of peroxide against this decomposition. However, the decomposition rates with most of these materials are rather slow. The action of these decomposition catalysts on dilute hydrogen peroxide in the presence of surfactants which are natural film formers is even slower than on the concentrate peroxides with which most of the catalyst studies have been done. Moreover, most of the catalyst study work that has been done has not been concerned with rapid decomposition of dilute solutions accompanied by exhaustion of the peroxide.

Of all the heavy metals and heavy metal compounds we have studied, argentous oxide ($Ag_2O$) and lead oxides appear to be the most active. However, because of the fact that lead is a cumulative poison, it cannot be considered in a use where the product coming in contact with it will be used in the way that the lather is intended to be used.

However, argentous oxide by itself is not a satisfactory catalyst. If it is used in powdered form, it will be swept out of the device and lost. If used in granular form, the product not only is too expensive, but it has too high a heat capacity as compared with its active surface, so that its absorbs too large a percentage of the heat which would otherwise go into the lather.

A satisfactory product can be made by distributing the silver oxide on any nonpowdery porous catalyst. For example, porous granules of aluminum oxide or magnesium oxide can be used, as well as active carbon. However, the preferred catalyst supports are fibers such as rayon, and the most preferred supports are combinations of rayon and oxides prepared by dissolving soluble silicate or aluminate in a viscose solution, and spinning into an acid bath to produce a viscose filament containing silica or alumina as described in the copending Wizon application Ser. No. 332,301, filed Dec. 20, 1963, now abandoned. The impregnated fibers have the advantages that they retain the catalyst most effectively. Moreover, the oxide impregnated rayon fibers appear to have the greatest activity of any of the catalyst tested.

The porous base should be in nonpowdery form, i.e., relatively free of particles below about 100 mesh (American standard) and most preferably considerably coarser. The preferred granules are +60 mesh. Generally, about 5 to 50% argentous oxide is deposited on the base, for most convenient handling.

Typical examples of the invention are as follows:

EXAMPLE 1

Silver oxide on alumina

To a liter beaker containing 730 grams of 52% aqueous silver nitrate was charged 270 grams of activated alumina, described as follows:

| | |
|---|---|
| Particle size range _____ mesh__ | 30–100 |
| Bulk density _____ | 0.96 |
| Specific gravity _____ | 3.99 |

The mixture was heated with stirring to the boiling point and allowed to cool to room temperature with occasional stirring. The mixture was filtered on a medium sized porous glass funnel with suction to remove excess solution. The wet solids were transferred to an 800 ml. beaker and warmed with agitation to drive off water and obtain a fluid bed of solids. The beaker and its light-colored contents were heated further over an open flame and with constant agitation until decomposition commenced, as evidenced by the dark fumes of nitrogen dioxide which appear at or about 444° C. Heating was continued at the decomposition temperature, until the dark fumes no longer appear and the solids were a uniform dull black. The entire process required forty minutes. Excessive or prolonged heating was avoided because of the slow reduction of silver oxide to silver which is brought about at temperatures over 180°. The dark colored solids were allowed to cool and were passed through sieves in order to obtain a narrow range of material of the folowing characteristics:

| | |
|---|---|
| Particle size range _____ mesh__ | 30–40 |
| Bulk density _____ | 1.38 |
| Specific gravity _____ | 4.13 |
| Percent silver content as $Ag_2O$ _____ | 23.22 |

To protect the catalyst a Plexiglas cylindrical chamber of dimensions ½ inch ID, 1 inch length with ⅜ inch openings was utilized for testing. A 60 mesh screen was inserted in the chamber over each opening. The chamber was then packed with 4.77 grams of the described granules. A solution of 10% aqueous hydrogen peroxide was pumped continuously through the chamber at the rate of 19.5 ml./min. and a chamber pressure of 1.0 p.s.i.g. The temperature of the effluent stream was recorded and percent of hydrogen peroxide remaining in the stream obtained at intervals by standard means. The results of the experiment are tabulated below as Run I. The apparatus was allowed to cool over a period of 18 hours and the experiment was repeated in order to check the activity of the used catalyst. Data are recorded below as Run II.

| Run I | | | Run II | | |
|---|---|---|---|---|---|
| Time | Temp., °F. | Percent $H_2O_2$ decomposed | Time | Temp., °F. | Percent $H_2O_2$ decomposed |
| 0_____ | 80 | 0 | 0_____ | 79 | 0 |
| 1 min____ | 162 | 100 | 15 sec___ | 135 | 100 |
| 5 min____ | 168 | 100 | 1 min____ | 161 | 99.9 |
| 10 min___ | 168 | 99.9 | 5 min____ | 167 | 99.4 |
| 15 min___ | 167 | 99.5 | 10 min___ | 167 | 98.3 |
| 20 min___ | 166 | 98.7 | 15 min___ | 166 | 96.9 |
| | | | 20 min___ | 166 | 95.5 |

The catalyst was tested in a foam producing device in which a main storage chamber contained a mixture of surfactant, hydrogen peroxide and water of the following composition:

| | Parts by weight |
|---|---|
| Polyoxyethylated octyl phenol _____ | 7.5 |
| Polyoxyethylene lauryl alcohol _____ | 7.5 |
| $H_2O_2$ (100%) _____ | 10 |
| Water _____ | 75.0 |

A decomposition chamber was provided in the shape of a tube 2.5 cm. long and about a centimeter in inside diameter, packed with +60 mesh catalyst, and with a screen at each end to prevent removal of the granular catalyst. The chamber was filled with foamable solution. Foaming started immediately and lather began to come out; it had warmed up within a few seconds and continuously increased in temperature for about 30 seconds. When the lather was contained in the tube by holding the end with a finger to simulate a valve, it was possible to get warm lather from the tube after about ten seconds.

EXAMPLE 2

Silver oxide on magnesia

To a 500 ml. beaker containing 260 grams of 54% aqueous silver nitrate was charged 100 grams of magnesia, described as follows:

| | |
|---|---|
| Particle size range _____ mesh__ | 20–60 |
| Bulk density _____ | 1.01 |
| Specific gravity _____ | 3.65 |

It was observed that after only a few seconds of exposure to the aqueous silver nitrate the granules darkened in color and a schlieren effect around the granules was noted. It was assumed that a reaction on the surface of the solids was taking place according to the following equation:

$$2Ag^+ + 2NO_3^- + MgO \rightarrow Mg^{++} + 2NO_3^- + Ag_2O$$

Heating of the mixture was modified from Example 1 in that a temperature of 80° was attained and the mixture allowed to cool slowly. The mixture was filtered on a medium sized porous glass funnel with suction to remove excess solution. The residue was washed three times with 150 ml. portions of distilled water. Drying in a beaker was effected over an open flame until the granules were no longer damp and were of a fluid nature. The solids were sieved and possessed the following characteristics:

| | |
|---|---|
| Particle size range _____ mesh__ | 20–60 |
| Bulk density _____ | 1.78 |
| Percent silver content as $Ag_2O$ _____ | 39.41 |

This catalyst was faster acting than the catalyst of Example 1, by a ratio of about 2.5 to 1.0, measured by the time necessary to produce 50 ml. of $O_2$ from 10% hydrogen peroxide under the conditions outlined in Example 1. On testing in a lather producing device with the apparatus described in Example 1, warm lather came out of the device in about five seconds.

EXAMPLE 3

Silver oxide on rayon

A saturated solution of silver ammonia hydroxide $[Ag(NH_3)_2OH]$ was prepared by agitating on excessive amount of dried silver oxide in 20 ml. of concentrated aqueous ammonia at 25°. The mixture was filtered. A sample of rayon tire yarn (0.2 gram) 1650 denier, 1500 filament was immersed in the filtrate for one hour at room temperature. The fiber acquired a gray color during the immersion. After removal from the bath excess solution was removed from the yarn by laying it upon a sheet of absorbent paper. The damp yarn was then warmed in air until the evolution of ammonia ceased and the material was dry. The material was washed with water containing traces of chlorine until the washings were clear. The drying in air was repeated and the material allowed to cool before testing.

This catalyst was about twice as fast acting as the catalyst of Example 1, and not quite as fast as the catalyst of Example 2.

EXAMPLE 4

Silver oxide on active carbon

To a saturated solution of silver ammonia hydroxide prepared according to Example 3 was charged 4 grams of 40 to 60 mesh activated coconut charcoal (Amend Drug and Chem. Co.). The material was allowed to soak with occasional stirring. After one hour the mixture was filtered with suction to remove excess solution, the solids were dried in air, washed to remove soluble material and redried in air as described in Example 3. The ability of the solids to initiate decomposition of dilute aqueous peroxide was checked as above and was shown to be about 3.0 times more active than the silver oxide on alumina described in Example 1.

EXAMPLE 5

Silver oxide on alumina impregnated cellulose

A 1650 denier 1500 filament yarn made according to the disclosure of the Wizon application Ser. No. 332,301, filed Dec. 20, 1963, now abandoned and containing 40% $Al_2O_3$ was utilized instead of the rayon tire yarn of Example 3; and was impregnated with $Ag_2O$ by the silver ammonia hydroxide technique of Example 3. This material was approximately 5 times as fast as the catalyst of Example 1; it produced warm lather within 1 to 2 seconds.

EXAMPLE 6

Example 5 was repeated, using a viscose impregnated with 40% $SiO_2$ instead of 40% $Al_2O_3$, in the form of a woven cloth. This proved to be about 13 times as active as the catalyst of Example 1, and produced warm lather almost instantaneously.

Obviously these examples can be multiplied indefinitely without departing from the spirit of the invention which is defined in the claims.

We claim:

1. A catalyst useful for the rapid decomposition of dilute hydrogen peroxide, comprising argentous oxide deposited on a porous nonpowdery base selected from the class consisting of magnesia, cellulosic fiber and cellulosic fiber impregnated with an inorganic oxide of the class consisting of silica and alumina.

2. The catalyst of claim 1 in which the porous nonpowdery base is magnesia.

3. The catalyst of claim 1 in which the porous nonpowdery base is cellulosic fiber.

4. The catalyst of claim 1 in which the porous nonpowdery base is cellulosic fiber impregnated with an inorganic oxide.

References Cited

UNITED STATES PATENTS

| | | | |
|---|---|---|---|
| 1,519,470 | 12/1924 | Wilson et al. | 252—447 |
| 2,593,099 | 4/1952 | Calingaert | 252—475 XR |
| 2,781,297 | 2/1957 | Appell | 252—476 XR |
| 1,222,608 | 4/1917 | Dewar et al. | 252—427 XR |
| 2,472,832 | 6/1949 | Hunter et al. | 252—454 XR |
| 2,881,214 | 4/1959 | Idol et al. | 252—476 XR |
| 2,477,435 | 7/1949 | Aries | 252—476 XR |
| 2,662,919 | 12/1953 | Hagemeyer et al. | 252—476 XR |
| 2,765,283 | 10/1956 | Sacken | 252—476 XR |
| 2,805,207 | 9/1957 | Metzger | 252—476 |
| 2,831,870 | 4/1958 | McClements et al. | 252—454 XR |
| 2,874,129 | 2/1959 | Bell | 252—454 |
| 3,193,512 | 7/1965 | Ciocchetti | 252—454 XR |

PATRICK P. GARVIN, *Primary Examiner.*

U.S. Cl. X.R.

252—90, 307, 475, 447, 476